United States Patent [19]

Ayres

[11] 3,941,699

[45] Mar. 2, 1976

[54] PLASMA SEPARATOR WITH CENTRIFUGAL VALVE

[75] Inventor: Waldemar A. Ayres, Rutherford, N.J.

[73] Assignee: Becton, Dickinson and Company, East Rutherford, N.J.

[22] Filed: Feb. 27, 1974

[21] Appl. No.: 446,366

[52] U.S. Cl. ................ 210/117; 210/136; 210/359; 210/516; 210/DIG. 23

[51] Int. Cl. ............................................ B01d 21/26

[58] Field of Search ....... 23/230 B, 258.5, 259, 292; 128/214 R, 272, 218 M; 210/83, 84, 109, 131, 359, DIG. 23, DIG. 24, 514–518, 117, 136; 233/1 A, 1 R, 26

[56] References Cited

UNITED STATES PATENTS

| | | | |
|---|---|---|---|
| 2,577,780 | 12/1951 | Lockhart | 128/272 X |
| 3,508,653 | 4/1970 | Coleman | 210/DIG. 23 |
| 3,586,064 | 6/1971 | Brown et al. | 233/26 X |
| 3,684,136 | 8/1972 | Baumann | 128/218 M X |

*Primary Examiner*—Charles N. Hart
*Assistant Examiner*—Robert H. Spitzer
*Attorney, Agent, or Firm*—Kane, Dalsimer, Kane, Sullivan and Kurucz

[57] ABSTRACT

An evacuated tube having both ends closed has a centrifugally actuated slit type valve fixedly disposed between the ends for dividing the tube into upper and lower chambers. The valve is formed and arranged to provide a passageway between the upper and lower chambers when subjected to a centrifugal force of proper intensity and direction. Upon cessation of the force, the valve closes to provide a separation between the upper and lower chambers.

5 Claims, 4 Drawing Figures

PLASMA SEPARATOR WITH CENTRIFUGAL VALVE

BACKGROUND OF THE INVENTION

1. Field of the Invention

The present invention relates to separators and more particularly to a device for separating blood plasma from cellular material of the type disclosed in commonly assigned application Ser. No. 247,483, filed Apr. 25, 1972, now U.S. Pat. No. 3,849,072.

2. Description of the Prior Art

With the development of modern pathology laboratories, it has become the common practice to send blood samples to a centralized laboratory facility for analysis. The normal procedure requires that the patient's blood sample be taken at a doctor's office or a clinic and thereafter mailed in a proper container to a centrally located laboratory to be tested. In many instances, it is desirable that the cellular material contained in a blood sample be separated from the blood plasma shortly after the sample is taken from the patient and prior to mailing. Centrifuging has become the accepted method for separation of the suspended cellular material from the blood plasma.

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064 3,661,265; 3,355,098; 3,481,477; 3,512,940 and 3,693,804. In all of these devices the serum is collected in a blood collection container and means are provided for separating the plasma or serum phase from the cellular phase employing filters, valves, transfer tubes or the like.

It is also known to provide assemblies for the sealed separation of blood in which a piston is actuated by centrifugal force such as is disclosed in U.S. Pat. Nos. 3,508,653 and 3,779,383. These devices use either a distortable piston made of a resilient material or valve means associated with the piston to affect a sealed separation after centrifugation.

SUMMARY OF THE INVENTION

The present invention contemplates an evacuated tube having closed ends and a centrifugally actuated slit valve fixedly disposed between the ends to divide the tube into upper and lower chambers. The valve includes an elastomeric body having a centrally located cylindrical opening closed off by an elastomeric bulb defined by a cylindrical member having a dome-shaped end provided with a normally closed slit. A pair of diametrically opposed masses are on the cylindrical member in line with the slit.

In a preferred embodiment, a tube is used having an opening at each end, said openings being closed with penetrable stoppers. The tube is evacuated through the stopper in the lower end so that the lower chamber is evacuated first. A pressure differential is developed across the valve which causes the slit to open. When this occurs, the upper and lower chambers come into communication so that the upper chamber is also evacuated.

The tube is filled by puncturing the stopper disposed in the upper end of the tube and the vacuum in the upper chamber draws blood into the tube. As the upper chamber is filled with blood, a pressure differential is developed across the bulb causing the slit to open and the blood to flow into the evacuated lower chamber. Thus, the entire container is filled with a blood sample.

Upon subsequent centrifuging the masses acting on each end of the slit in the bulb cause the slit to open. In this way a passage is formed connecting the upper and lower chambers so that the heavier blood cells flow in a downwardly direction causing the lighter plasma to be displaced into the upper chamber of the tube in a manner well known in the art.

When centrifuging is discontinued, the elastomeric bulb returns to its normal position with the slit closed so that a seal is provided between the cellular material and the plasma.

The primary objective of the present invention is to provide an improved device that may be used to collect a blood sample from a patient, and separate the blood sample into its light and heavy phases, all at relatively reduced costs.

The foregoing objectives and advantages of the invention will appear more fully hereinafter from a consideration of the detailed description which follows, taken together with the accompanying drawings. It is to be expressly understood, however, that the drawings are for illustrative purposes only and are not to be considered as defining the limits of the invention.

DETAILED DESCRIPTION OF THE PREFERRED EMBODIMENT

Figure 1:
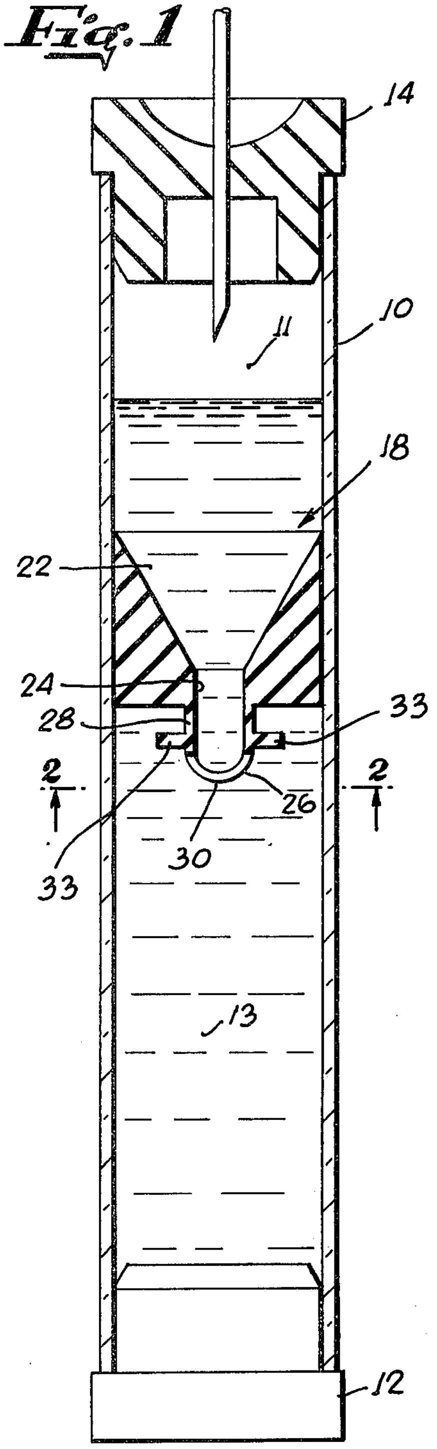
FIG. 1 is a longitudinal section of the present invention with blood collected in both chambers, and the centrifugally actuated valve in a closed condition.

Referring to FIG. 1, there is shown a glass tube 10, having openings at each end which are closed by stoppers 12 and 14. Stoppers 12 and 14 are preferably resilient and penetrable by a cannula for purposes of evacuating and filling the tube.

It is to be understood that the valve could be positioned in many ways well known in the art as discussed in the above referenced application. The fit between the valve and the inside diameter of the tube is of sufficient tightness so that once the valve is forced into a particular position during assembly the frictional forces between the valve and the tube will retain the valve at the desired position during its life including periods of centrifuging.

The valve is positioned so that it is above an interface 17 that is formed between the plasma and the cellular material of the blood after centrifuging. This is essential so that the plasma remains free of cellular material during mailing of the sample.

Valve 18 is made of an elastomeric material such as an inert rubber or plastic material. Valve 18 has a conical-shaped upper surface 22 forming a funnel that is in communication with a cylindrical opening 24 formed in the center of the valve and extending therethrough. The upper periphery of surface 22 terminates in a feather edge which seals against the inner surface of the tube 10 to facilitate unrestricted flow of cellular material through the valve during centrifuging and to prevent blood cells from being caught between the valve and the inner surface of the tube.

Figure 4:
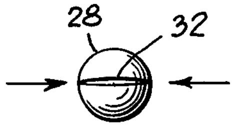
FIG. 4 is a bottom plan view of the open slit valve.
Figure 2:
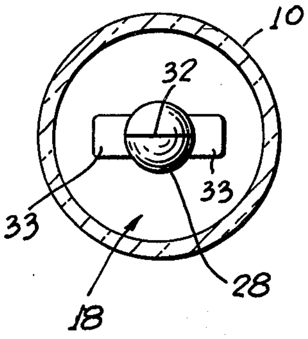
FIG. 2 is a sectional view taken along line 2—2 of FIG. 1 showing the base of the slitted bulb and opposed masses.
Figure 3:
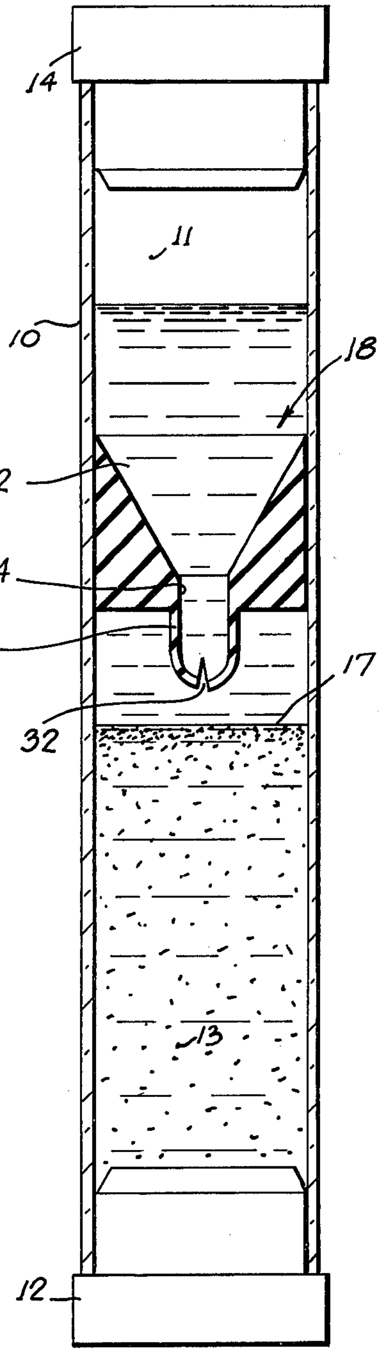
FIG. 3 is a view similar to FIG. 1 showing the valve open when subjected to centrifugal force and the blood separated into its component phases.

Forming part of the valve 18 and extending across the cylindrical passageway 24 is a bulb 26 of relatively thin, resilient material. The bulb includes a cylindrical part 28 defining an extension of passageway 24 and a dome-shaped closed end 30. A normally closed slit 32 is cut in the end 30. Masses 33 are located at the ends of the slit and function as unbalanced masses under the thrust of centrifugal force to open the slit 32 thereby providing a passage between the upper chamber 11 and lower chamber 13. In this connection, the masses 33, being attached only at their inner ends will produce inward thrust vectors, as represented by the arrows in FIG. 4. These squeezing vectors will cause slit 32 to open.

After the valve is inserted in tube 10, stoppers 12 and 14 are placed in their respective ends and the tube may be evacuated through stopper 12 in a manner well known in the art. Evacuation of the lower chamber 11 causes a pressure differential across valve 18 thereby causing the bulb 26 to be displaced downwardly opening a slit 32 to the upper chamber 13 so that it too is evacuated.

When the tube is to be filled with a blood sample, stopper 14 is punctured with a cannula so that blood is drawn into the evacuated upper chamber 13. As the upper chamber 13 fills with blood, a pressure differential is again created across valve 18 causing slit 32 to open thereby allowing blood to flow into the lower chamber 11 so that the entire tube is filled with the blood sample.

In order to separate the plasma from cellular material, the entire device is centrifuged so that centrifugal force is exerted in the direction of stopper 12. The masses 33 are urged in a downwardly direction causing squeezing force vectors which open slit 32 so that a passage is formed between the upper 11 and lower 13 chambers. The heavier red blood cells flow in a downwardly direction displacing the plasma in the lower chamber 13 so that it flows in an upwardly direction into the upper chamber 11 until a plasma-cell interface 17 is established below valve 18. After interface 17 is established, centrifuging is stopped and the bulb 26 returns to its normal position whereby slit 32 is closed thereby creating a permanent separation between the upper and lower chambers.

Thus the present invention provides an inexpensive and uncomplicated device for taking blood samples, and for separating the blood into its constituent phases. Thus the several aforenoted objects and advantages are most effectively attained. Although a preferred embodiment has been disclosed and described in detail herein, it should be understood that this invention is in no sense limited thereby and its scope is to be determined by that of the appended claims.

I claim:

1. A separator device for separating mixed light phase and heavy phase constituents of blood and establishing a permanent barrier between said phases, including:

a tubular container sealed at both ends and adapted to contain the blood to be separated;

elastomeric barrier means fixedly located intermediate the container ends and dividing the container into first and second chambers which upon the application of centrifugal force are adapted to contain in major proportions the light phase and heavy phase, respectively;

a passageway through the barrier means connecting the first and second chambers; and a bulb extending over and closing the passageway, the bulb having a normally closed slit, and thrust generating means attached to said bulb and responsive to centrifugal force to open the slit, the bulb normally sealing off the passageway to provide a barrier between first and second chambers, and when subjected to a predetermined centrifugal force, the thrust generating means flexes open the slit to open the passageway to provide communication between the chambers to permit the light phase to travel to the first chamber and the heavy phase to travel to the second chamber, and upon cessation of the applied centrifugal force, the bulb returns to its normal position to seal off the passageway and provide a barrier between the first and second chambers.

2. A separator device according to claim 1, wherein one of the container closed ends includes a needle penetrable stopper facilitating the introduction of blood into the container.

3. The invention in accordance with claim 1, wherein the barrier means includes a conical surface, adjacent the first chamber, which forms a funnel that is in communication with the passageway to facilitate the separation of the phases and the flow of the heavy phase into the second chamber.

4. The invention in accordance with claim 1, wherein the thrust generating means includes a pair of diametrically opposed masses, one on each end of the slit which provide a radially inwardly extending force vector during centrifugation to provide the squeezing action which opens the slit.

5. The invention in accordance with claim 4, wherein the bulb includes a cylindrical portion being an integral part of the barrier means and defining an extension of the passageway and an integral dome-shaped end which includes the slit, and the masses extending radially from the cylindrical portion.

* * * * *